United States Patent [19]

Nomura et al.

[11] Patent Number: 5,011,233
[45] Date of Patent: Apr. 30, 1991

[54] CAP FOR HUB UNIT AND HUB UNIT FOR AXLE OF AUTOMOBILE

[75] Inventors: Yasuhiro Nomura; Naoki Mitsue, both of Kanagawa, Japan

[73] Assignee: Nippon Seiko Kabushiki Kaisha, Tokyo, Japan

[21] Appl. No.: 435,866

[22] Filed: Nov. 13, 1989

[30] Foreign Application Priority Data

Nov. 18, 1988 [JP] Japan .......................... 63-149650[U]
Jul. 20, 1989 [JP] Japan .............................. 1-84519[U]

[51] Int. Cl.⁵ .......................... B60B 27/00; B60B 7/00
[52] U.S. Cl. ............................ 301/108 R; 301/108 A
[58] Field of Search ........... 301/105 R, 108 A, 108 R, 301/108 S, 108 SC, 108 TW

[56] References Cited

U.S. PATENT DOCUMENTS

| | | | |
|---|---|---|---|
| 3,460,874 | 8/1969 | Johnson | 301/108 R |
| 3,642,327 | 2/1972 | Walther | 301/108 R |
| 4,179,167 | 12/1979 | Lura et al. | |
| 4,190,133 | 2/1980 | Ploeger | 301/108 R X |

FOREIGN PATENT DOCUMENTS

| | | | |
|---|---|---|---|
| 2626834 | 1/1977 | Fed. Rep. of Germany | 301/105 R |
| 132102 | 10/1981 | Japan | |
| 46703 | 3/1984 | Japan | |
| 625723 | 7/1949 | United Kingdom | 301/108 SC |

*Primary Examiner*—Russell D. Stormer
*Attorney, Agent, or Firm*—Caesar, Rivise, Bernstein, Cohen & Pokotilow, Ltd.

[57] ABSTRACT

A cap for a hub unit having a projecting wall so that when the cap is attached to a hub unit for an axle is of an automobile, the projecting wall prevents grease in the rotary portion of the hub unit from moving to the inside of the cap.

4 Claims, 3 Drawing Sheets

CAP FOR HUB UNIT AND HUB UNIT FOR AXLE OF AUTOMOBILE

BACKGROUND OF THE INVENTION

1. Field of the Invention

The present invention relates to a cap for a hub unit and also to a hub unit for an axle of an automobile. More particularly, the present invention aims at reducing the number of parts required for a hub unit that is used to rotatably support an axle of an automobile with respect to a suspension system, thereby lowering the production cost of the hub unit.

2. Description of the Prior Art

An axle of an automobile is rotatably supported with respect to the car body, by a suspension system, by means of a hub unit having a structure such as that shown in FIG. 5.

Referring to FIG. 5, reference numeral 1 denotes a hub which has a flange 2 rigidly secured to the outer peripheral surface thereof to secure a wheel, and an inner ring 3 is fitted on the hub 1. A plurality of rows of outward race ways 4 are formed on the outer peripheral surfaces of the hub 1 and the inner ring 3. Reference numeral 5 denotes an outer ring, which is supported by a suspension system through a mounting flange 6 that is provided on a part of the outer peripheral surface thereof. The outer ring 5 has a plurality of rows of inward race ways 7 formed on the inner peripheral surface thereof.

The reference numeral 8 denotes rolling elements, which are disposed in between the outward race ways 4 formed on the outer peripheral surfaces of the hub 1 and the inner ring 3 and the inward race ways 7 formed on the inner peripheral surface of the outer ring 5, thereby enabling the hub 1 to be rotatable inside the outer ring 5.

A cylindrical space 9 is defined between the inner peripheral surface of the outer ring 5 and the outer peripheral surface of the hub 1. The opening at one end (the opening at the left-hand end as viewed in FIG. 5) of the cylindrical space 9 is closed with a sealing member 14, while the opening at the other end is closed with a hub cap 10 that is firmly fitted into the opening at the other end (the right-hand end as viewed in FIG. 5) of the outer ring 5, thereby preventing dust from entering the cylindrical space 9 and also preventing the grease in the space 9 from leaking to the outside.

The hub cap 10 is formed into a cup-like configuration from a metallic plate, for example, a stainless steel plate, by means of drawing. The hub cap 10 has an outward flange-shaped stopper 11 formed on the outer peripheral surface thereof. With the outer diameter being elastically contracted, the forward half (the left-hand half as viewed in FIG. 5) of the hub cap 10 is forced into the end portion of the opening in the outer ring 5 until the stopper 11 abuts against the end face of the outer ring 5, thereby securing the hub cap 10 to the opening at the right-hand end of the outer ring 5, and thus closing the opening at this end.

Further, an annular partition member 12, known as a slinger, is disposed between the outer ring 5 and the hub cap 10 in such a manner that the outer peripheral edge of the partition member 12 is secured to the inner peripheral surface of the outer ring 5 at the inward race way 7 that is closer to the right-hand end (as viewed in FIG. 5) of the outer ring 5, thereby preventing the grease in the space accommodating the rolling elements 8 from flowing out into the space 13 in the hub cap 10.

The above-described conventional hub unit suffers, however, from the following problems. Since the partition member 12 is independently provided to prevent the grease in the space accommodating the rolling elements 8 from flowing out into the space 13 in the hub cap 10, the number of parts required to constitute the hub unit is increased, so that the parts handling and assembling operations are complicated and the production cost of the hub unit is unavoidably increased.

It is possible to omit the partition member 12 if the amount of grease filling the space between the inner peripheral surface of the outer ring 5 and the outer peripheral surface of the hub 1 is increased so that, even if the space 13 is filled with grease, a sufficiently large amount of grease is present in the space accommodating the rolling elements 8. This practice is, however, not preferable since an excessive amount of grease must be used instead.

SUMMARY OF THE INVENTION

It is a first object of the present invention to provide a cap for a hub unit which is free from the above-described problems of the prior art.

It is a second object of the present invention to provide a hub unit for an axle of an automobile which is free from the above-described problems of the prior art.

To attain the first object, the present invention provides a cap for use in a hub unit including a member equivalent to an inner ring having an outward race way on the outer peripheral surface thereof, a member equivalent to an outer ring having an inward race way on the inner peripheral surface thereof, and a plurality of rolling elements disposed in between the outward and inward race ways, the cap being secured to the opening at one end of the outer ring equivalent member to close the opening, wherein the improvement comprises a projecting wall formed on a secured portion of the cap which is secured to the opening to prevent grease present in the space accommodating the rolling elements from moving toward the opening.

To attain the second object, the present invention provides a hub unit for an axle of an automobile including a member equivalent to an inner ring having a plurality of rows of outward race ways on the outer peripheral surface thereof, a member equivalent to an outer ring having a plurality of rows of inward race ways on the inner peripheral surface thereof, a plurality of rolling elements disposed in between the outward and inward race ways, and a cup-shaped hub cap secured to the opening at one end of the outer ring equivalent member to close the opening, wherein the improvement comprises a projecting wall formed on a portion provided on the hub cap to secure it to the opening so as to prevent grease present in the space accommodating the rolling elements from moving toward the opening.

The functions per se of the cap for a hub unit and the hub unit for an axle of an automobile according to the present invention, which are arranged as described above, that is, the function of preventing dust from entering the inside of the hub unit by closing the openings at the two ends of the hub unit and the function of rotatably supporting the hub with respect to the outer ring, are the same as those in the aforementioned prior art.

In the hub unit cap and the hub unit for an axle of an automobile according to the present invention, however, the grease that is present in the space accommodating a plurality of rolling elements is prevented from moving toward the above-mentioned opening by means of the inward flange-shaped projecting wall that is provided as being an integral part of the hub cap without the need to provide a partition member such as described above.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and of which.

DETAILED DESCRIPTION OF THE PREFERRED EMBODIMENTS

The present invention will be described below in detail by way of embodiments and with reference to the accompanying drawings.

Figure 1:
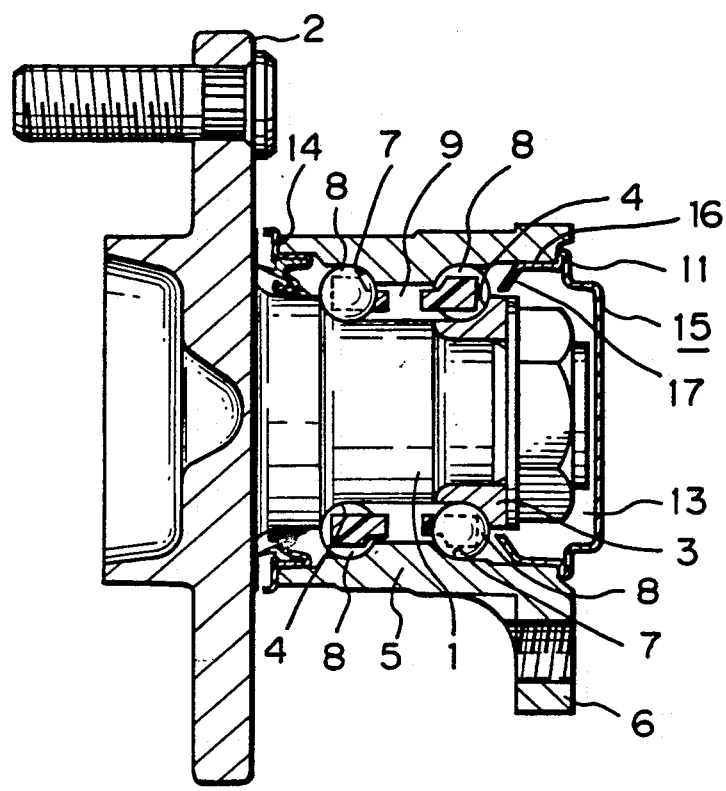
FIG. 1 is a sectional view showing a first embodiment of the present invention.

Referring to FIG. 1, which is a sectional view showing a first embodiment of the present invention, a hub 1 has a flange 2 rigidly secured to the outer peripheral surface thereof to secure a wheel, and an inner ring 3 is fitted on the hub 1. A plurality of rows of outward race ways 4 formed on the outer peripheral surfaces of the hub 1 and the inner ring 3, while a plurality of rows of inward race ways 7 are formed on the inner peripheral surface of an outer ring 5 which is supported by a suspension system through a mounting flange 6 provided on a part of the outer peripheral surface of the outer ring 5.

Rolling elements 8 are disposed in between the outward race ways 4 formed on the outer peripheral surfaces of the hub 1 and the inner ring 3 and the inward race ways 7 formed on the inner peripheral surface of the outer ring 5, thereby enabling the hub 1 to be rotatable inside the outer ring 5.

A cylindrical space 9 is defined between the inner peripheral surface of the outer ring 5 and the outer peripheral surface of the hub 1. The opening at one end (the opening at the left-hand end as viewed in FIG. 1) of the cylindrical space 9 is closed with a sealing member 14, while the opening at the other end is closed with a hub cap 15 that is firmly fitted into the opening at the other end (the right-hand end as viewed in FIG. 1) of the outer ring 5, thereby preventing dust from entering the cylindrical space 9 and also preventing the grease in the space 9 from leaking to the outside.

The hub cap 15 is formed into a cup-like configuration from a metallic plate, for example, a stainless steel plate, by a process of drawing. The hub cap 15 has an outward flange-shaped stopper 11 formed on the outer peripheral surface thereof. With the outer diameter being elastically contracted, a secured portion 16 which is present on the forward half (the left-hand half as viewed in FIG. 1) of the hub cap 15 is forced into the end portion of the opening in the outer ring 5 until the stopper 11 abuts against the end face of the outer ring 5, thereby securing the hub cap 15 to the opening at the right-hand end of the outer ring 5, and thus closing the opening at this end.

The above-described arrangement is the same as in the case of the conventional hub unit stated above. This embodiment, however, differs from the prior art in the structure of the hub cap that is incorporated into the hub unit. The hub cap 15 of the present invention has an inward flange-shaped projecting wall 17 which is formed over the entire circumference by bending inward the edge of the forward end portion (the left-hand end portion as viewed in FIG. 1) thereof. The inner peripheral edge portion of the projecting wall 17 is disposed in close proximity to the outer peripheral edge of the end portion of the inner ring 3 firmly fitted on the hub 1, thereby separating the space accommodating the rolling elements 8 from the space 13 within the hub cap 15.

The functions per se of the cap for a hub unit and the hub unit for an axle of an automobile according to the present invention, which are arranged as described above, that is, the function of preventing dust from entering the inside of the hub unit by closing the openings at the two ends of the hub unit and the function of rotatably supporting the hub 1 with respect to the outer ring 5, are the same as those in the aforementioned prior art.

In the hub unit cap and the hub unit for an axle of an automobile according to the present invention, however, the grease that is present in the space accommodating a plurality of rolling elements 8 is prevented from moving toward the above-mentioned opening by means of the inward flange-shaped projecting wall 17 that is provided as an integral part of the hub cap 15 at the end thereof.

Figure 5:
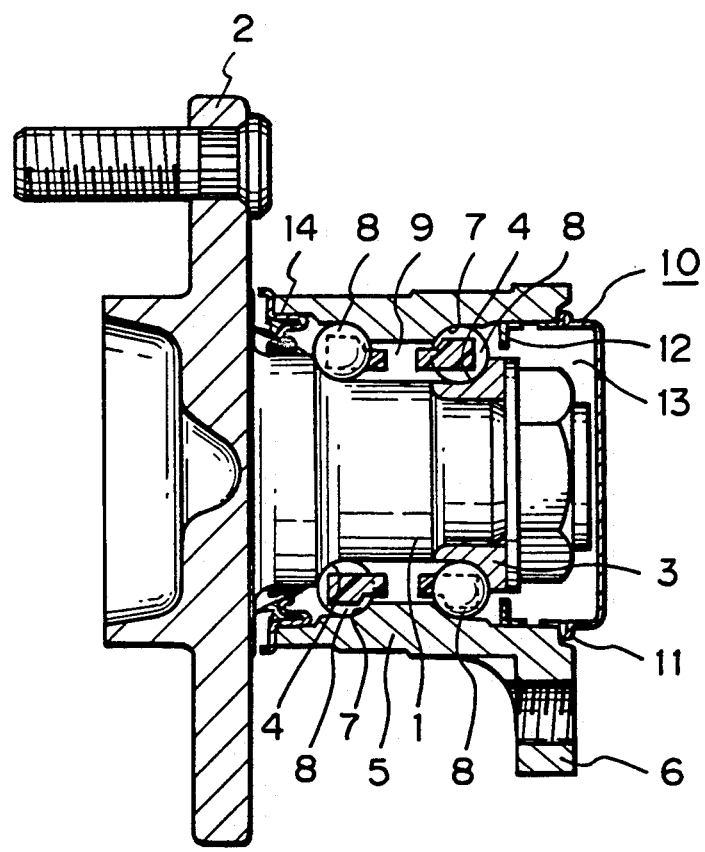
FIG. 5 is a sectional view showing a prior art hub cap.

Accordingly, the amount of grease present in the space accommodating the rolling elements 8 can be maintained at an adequate level for a long period of time without the need to provide the partition member (see FIG. 5) as in the prior art nor the need to fill the hub unit with grease in excess of an amount needed to lubricate the rolling elements 8.

Figure 2:
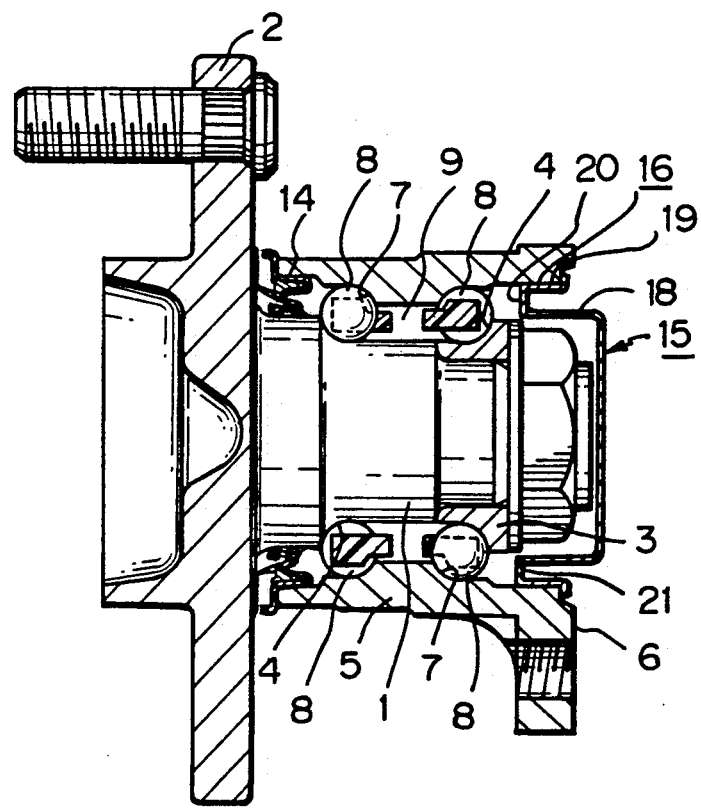
FIG. 2 is a sectional view showing a second embodiment of the present invention.

FIG. 2 shows a second embodiment of the present invention. In this embodiment, the secured portion 16 of the hub cap 15 has a structure in which an inner cylindrical portion 18 and an outer cylindrical portion 19 are contiguously connected through a bottom wall portion 20 such that an annular recess 21 is defined between the three portions 18, 19 and 20.

In this embodiment, the outer cylindrical portion 19 is forced into the outer ring 5 so as to engage with the inner peripheral surface thereof when the hub cap 15 is firmly fitted into the end portion of the opening in the outer ring 5.

In this embodiment, the bottom wall portion 20 is arranged to function as a projecting wall to prevent the grease present in the space accommodating the rolling elements 8 from moving toward the above-mentioned opening.

Since the other arrangements and functions are the same as those in the foregoing first embodiment, the same elements or portions are denoted by the same reference numerals and repeated description is omitted.

Figure 3:
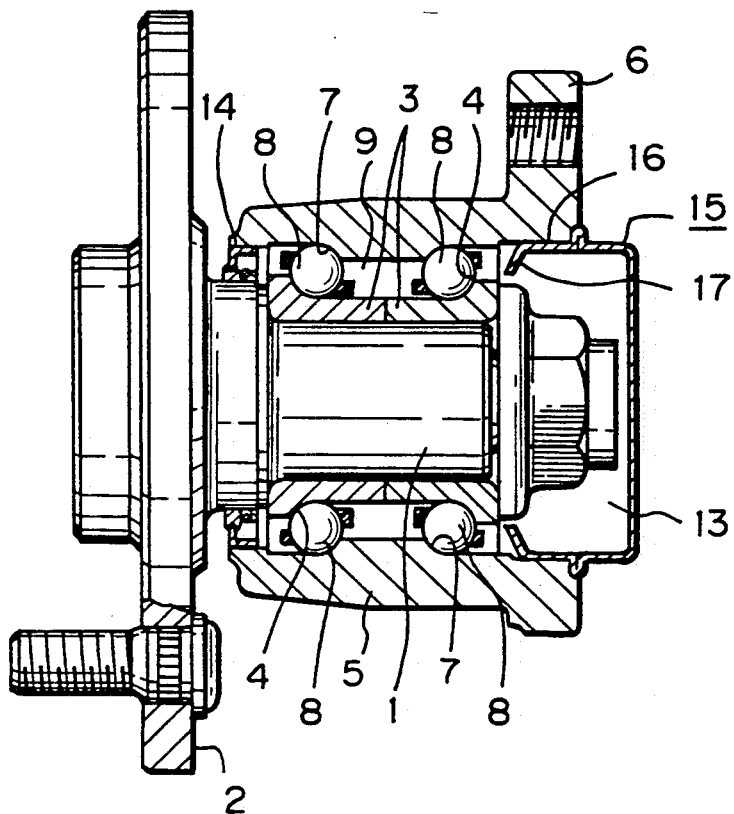
FIG. 3 is a sectional view showing a third embodiment of the present invention.
Figure 4:
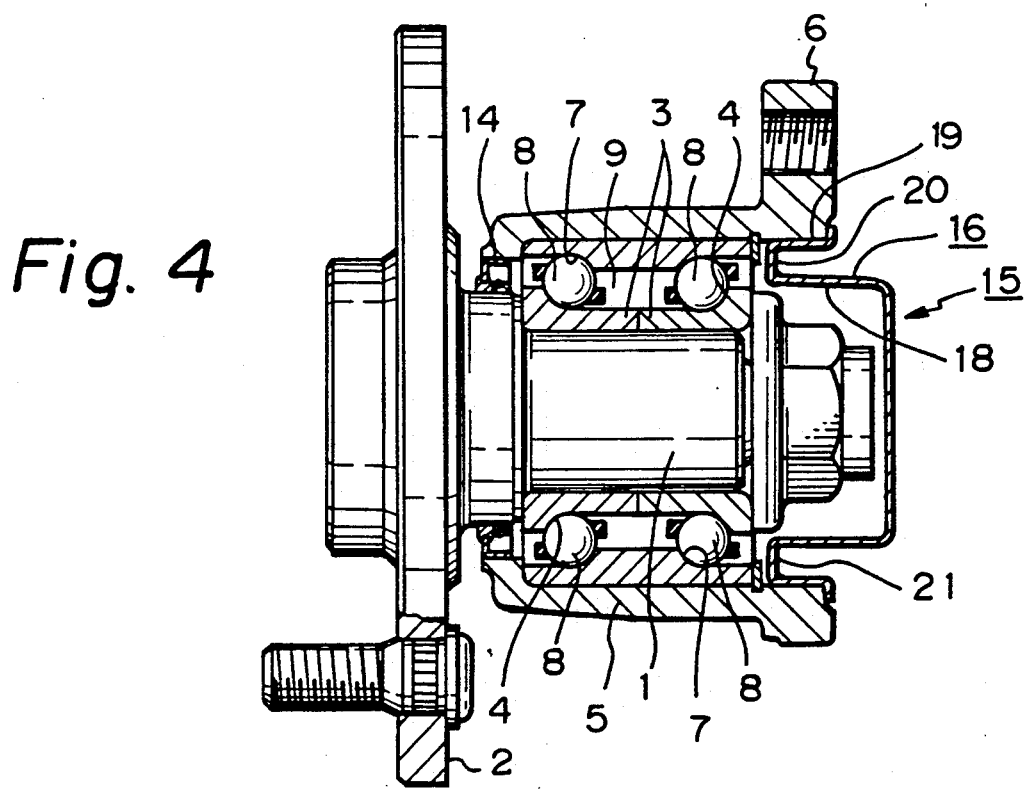
FIG. 4 is a sectional view showing a fourth embodiment of the present invention.

FIGS. 3 and 4 show third and fourth embodiments, respectively, of the present invention. In these embodiments, two inner rings 3 having outward race ways 4 formed on the respective outer peripheral surfaces are firmly fitted on the outer peripheral surface of the hub 1 instead of forming the outward race ways 4 directly on the outer peripheral surface of the hub 1.

Since the other arrangements and functions are the same as those in the foregoing first and second embodiments, the same elements or portions are denoted by the same reference numerals and a repeat description is therefore omitted.

The cap for a hub unit and the hub unit for an axle of an automobile according to the present invention have the above-described arrangements and functions. It is therefore possible to lower the production cost of the hub unit by a reduction in the number of parts required for the hub unit, without the need to employ an excessive amount of grease.

Although the present invention has been described through specific terms, it should be noted here that the described embodiments are not necessarily exclusive and that various changes and modifications may be imparted thereto without departing from the scope of the invention which is limited solely by the appended claims.

What is claimed is:

1. A cap for use in a hub unit including an inner ring member having an outer peripheral surface with an outward race way thereon, an outer ring member having an inner peripheral surface including an inward race way thereon, and a plurality of rolling elements disposed in between said outward and inward race ways, said cap being secured to the opening at one end of said outer ring member to close said opening, said cap having a secured forward portion engaging the inner peripheral surface of the outer ring member adjacent said opening at said one end of said outer ring member and a projecting wall integrally formed with said secured forward portion, said projecting wall extending from said secured forward portion inwardly toward said inner ring member and having a peripheral edge in close proximity to said inner ring member to prevent grease present in the space accommodating said rolling elements from moving toward said opening.

2. A hub unit cap according to claim 1, wherein said projecting wall is a flange extending inwardly from a forward end edge of said secured portion.

3. A hub unit cap according to claim 1, wherein said secured portion includes an outer cylindrical portion engaging the inner peripheral surface of the outer ring member adjacent said opening, said outer cylindrical portion being connected through a bottom wall portion to an inner cylindrical portion, said bottom wall portion constituting the projecting wall.

4. A hub unit for an axle of an automobile including an inner member having a plurality of rows of outward race ways on the outer peripheral surface thereof, an outer member having a plurality of rows of inward race ways on the inner peripheral surface thereof, a plurality of rolling elements disposed in between said outward and inward race ways, and a cup-shaped hub cap secured to the opening at one end of said outer member to close said opening, said cap having a secured portion engaging the inner peripheral surface of the outer member adjacent said opening at said one end of said outer member and a projecting wall integrally formed with said secured portion, said projecting wall extending inwardly toward said inner member and terminating in a peripheral edge in close proximity to said inner member to prevent grease present in the space accommodating said rolling elements from moving toward said opening.

* * * * *